(12) United States Patent
Sailer et al.

(10) Patent No.: US 12,149,056 B2
(45) Date of Patent: Nov. 19, 2024

(54) JOINT-USE BRACKET FOR INSTALLING COMMUNICATION LINES ON UTILITY POLE

(71) Applicant: VAF Industries, LLC, Escondido, CA (US)

(72) Inventors: Glenn Sailer, Escondido, CA (US); Raymond Tai, San Marcos, CA (US)

(73) Assignee: VAF Industries, LLC, Escondido, CA (US)

( * ) Notice: Subject to any disclaimer, the term of this patent is extended or adjusted under 35 U.S.C. 154(b) by 249 days.

(21) Appl. No.: 17/994,142

(22) Filed: Nov. 25, 2022

(65) Prior Publication Data

US 2023/0085769 A1   Mar. 23, 2023

Related U.S. Application Data

(63) Continuation-in-part of application No. 16/915,998, filed on Jun. 29, 2020, now Pat. No. 11,569,648.

(51) Int. Cl.
| | |
|---|---|
| *H02G 7/05* | (2006.01) |
| *F16L 3/10* | (2006.01) |
| *F16L 3/22* | (2006.01) |
| *H02G 1/04* | (2006.01) |
| *H02G 7/20* | (2006.01) |

(52) U.S. Cl.
CPC .............. *H02G 1/04* (2013.01); *F16L 3/1091* (2013.01); *F16L 3/222* (2013.01); *H02G 7/205* (2013.01)

(58) Field of Classification Search
CPC ............ H02G 7/05; H02G 7/20; H02G 7/205; H02G 7/00; H02G 7/02; H02G 7/06; H02G 7/12; H02G 1/04; F16L 3/222; F16L 3/1091

USPC ..... 174/68.1, 68.3, 40 R, 43, 44, 45, 40 CC, 174/88 R, 70 C, 70 A; 248/74.1, 74.2, 248/200; 385/134, 135

See application file for complete search history.

(56) References Cited

U.S. PATENT DOCUMENTS

| | | | | |
|---|---|---|---|---|
| 2,354,919 | A | * | 8/1944 | Lockwood ............ F16L 3/2235 248/68.1 |
| 3,752,902 | A | | 8/1973 | Wilson |
| 3,957,238 | A | * | 5/1976 | Bourrieres ................ H02G 7/20 174/149 R |
| 4,025,824 | A | * | 5/1977 | Cheatham ................ H02B 5/02 174/45 R |

(Continued)

*Primary Examiner* — Angel R Estrada
(74) *Attorney, Agent, or Firm* — LambentIP

(57) ABSTRACT

A joint-use bracket (JUB) for use for installing multiple cables associated with communication lines onto a joint-use section of a utility pole is disclosed. The JUB comprises: a curved plate having a generally rectangular shape elongated in a longitudinal direction and curved along a lateral direction, the curved plate formed to have multiple attachment holes therethrough and have multiple slots laterally formed on the front surface; multiple platforms, each platform contiguously formed on the front surface of the curved plate and having multiple receiving holes; multiple blocks configured to engage with the platforms, respectively, each block having multiple joining holes; and multiple joining fasteners configured to be inserted through the joining holes and the receiving holes, to fasten the block to the platform to clamp the cable that is placed laterally between the block and the platform, thereby to hold the cable securely.

10 Claims, 9 Drawing Sheets

(56) References Cited

U.S. PATENT DOCUMENTS

| | | | | |
|---|---|---|---|---|
| 4,431,152 | A | * | 2/1984 | Reed, Jr. .............. H02G 3/0683 |
| | | | | 248/65 |
| 5,078,347 | A | | 1/1992 | Sharpe |
| 5,931,423 | A | | 8/1999 | Heideloff |
| 6,311,006 | B1 | * | 10/2001 | Forrester ................ G02B 6/483 |
| | | | | 385/100 |
| 8,596,590 | B2 | | 12/2013 | McCoy |
| 8,973,766 | B2 | | 3/2015 | Sprang, Jr. |
| 10,355,467 | B1 | | 7/2019 | Conrad |
| 10,975,988 | B2 | * | 4/2021 | Pieske ................... F16L 3/1091 |
| 11,050,225 | B2 | * | 6/2021 | Santos .................. H02G 7/205 |
| 11,569,648 | B2 | * | 1/2023 | Sailer .................... H02G 7/053 |
| 11,639,759 | B2 | * | 5/2023 | Itokazu ................... H02G 3/32 |
| | | | | 248/68.1 |

* cited by examiner

JOINT-USE BRACKET FOR INSTALLING COMMUNICATION LINES ON UTILITY POLE

CROSS-REFERENCE TO RELATED APPLICATION

This U.S. Patent Application is a continuation-in-part of the U.S. patent application Ser. No. 16/915,998 filed on Jun. 29, 2020.

BACKGROUND

A utility pole is used to support power lines, electrical cables, fiber optic cables and related equipment. A standard utility pole in the United States is about 40 ft (12 m) long and is buried about 6 ft (2 m) in the ground, and can be made of wood, metal, concrete, or composites such as fiberglass. The power lines, including wires for power distribution and associated equipment, are typically mounted at the top portion of the pole, where the wires are mounted typically on a horizontal crossarm attached to the pole, and several pieces of power-distribution equipment, e.g., fuse cutouts, a lightning arrestor, a distribution transformer, etc., are mounted near the wires. Below the top portion of the pole designated for power lines, a vertical space along the pole is designated for supporting communication lines, examples of which include copper or fiber optic cables for telecommunication lines, coaxial cables for cable televisions, coaxial or fiber optic cables linking computer networks, etc. Utility poles may also carry other equipment such as streetlights, trolley wires, cellular network antennas, etc. In general, providers of electricity, television, telephone, streetlight, traffic signal and other services share poles, either in joint ownership or by renting space to each other, commonly referred to as "joint use."

A wide variety of pole attachment hardware are provided to secure the cables, wires, and individual pieces of associated equipment to the poles. Examples of these attachment devices include braces, bands, straps, guards, brackets, clamps, hooks, bolts, screws, anchors, etc. Design and implementation of these attachment devices must conform to strict standards and regulations, as compiled, for example, in *Telcordia GR-3174, Generic Requirements for Hardware Attachments for Utility Poles*, to facilitate reliable physical support, proper directional guiding to accommodate lateral stresses, safe grounding and isolation for electrical parts, and other mechanical and electrical provisions.

To mount an attachment device onto a pole, the pole itself must be configured to receive the attachment device in a secured fashion. For example, holes may be drilled in wood poles to fit the exact hardware needs and requirements. Fasteners such as bolts and screws can be easily applied to wood structures to fasten hardware pieces to wood poles. On the other hand, drilling holes in concrete poles is not feasible. In this case, bands or straps may be used to fasten hardware pieces onto concrete poles on site. Although it is possible to drill holes in steel poles or weld metal objects to steel poles, these processes are not recommended due to potential operational and practical hazards as well as economical disadvantages. Strapping or banding may be a feasible alternative to reliably fasten hardware pieces onto steel poles. Fiber-reinforced composite (FRC) poles can be pre-drilled, or holes can be drilled on-site. However, a certain type of fasteners such as lag bolts, teeth, nails, staples, and the like are unacceptable for FRC poles.

As explained above, mounting pole attachment hardware on already-built poles on-site requires careful considerations with respect to safety, feasibility, labor and cost, depending on the type of equipment to install as well as the type and location of the pole to be used for accommodating the equipment. It should be noted also that adding too many holes and objects to a pole will ultimately lead to structural weakness, a "mess" generated by tangled wires and loose pieces, and other functional and visual degradation. In some areas, the communication companies are making holes in existing poles and installing their communication lines haphazardly, occasionally too close to the power lines, creating a hazard for the power utility.

With the advancement of communication technologies, it is expected that more and more providers of the Internet, telephone, and cable TV services will come into play and scramble for the limited space available on utility poles to install their own cables and equipment. In view of the above problems associated with the crowded utility poles with too many cables and equipment pieces, this document describes a new type of pole attachment hardware to reliably install multiple communication lines in an orderly fashion, which will help eliminate the troublesome interference between individual lines and mitigate structural damages to the utility poles.

DETAILED DESCRIPTION

Figure 1:
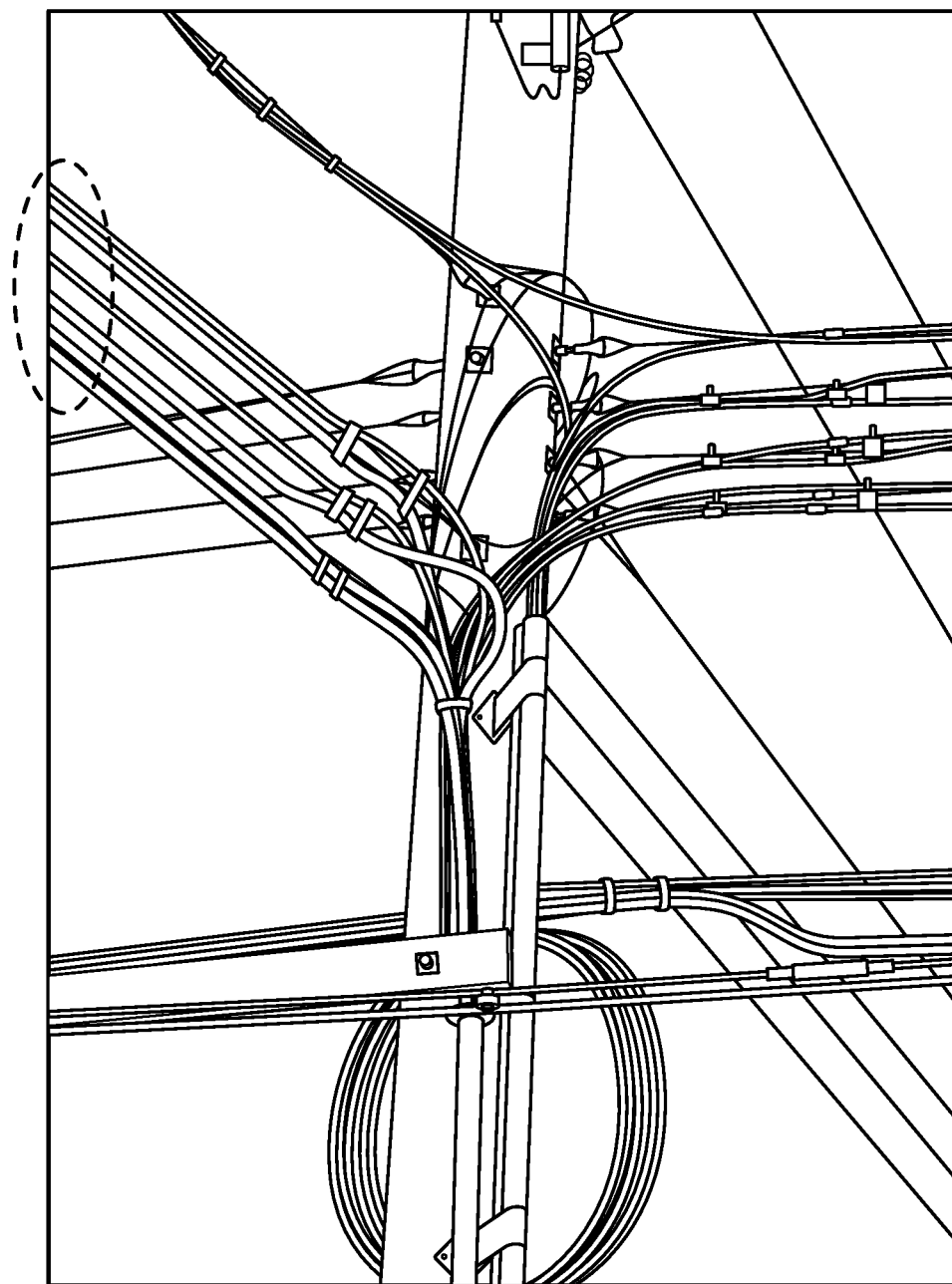
FIG. 1 illustrates a typical example of a utility pole installed with many cables, wires, and equipment pieces.

FIG. 1 illustrates a typical example of a utility pole installed with many cables, wires, and equipment pieces, especially showing the joint-use section for communication lines. In general, the joint-use section on a utility pole is shared by multiple communication companies (e.g., AT&T, Cox, Frontier, Spectrum, etc.) to provide the telephone, cable TV, Internet, and associated communication services. In FIG. 1, there are six communication lines, indicated by a circle with broken line, below several guying lines that are used to support and secure the pole and are either attached to a stub (support) pole or an anchor. Each communication line in this section is owned and managed by one specific company, who has installed its own cables and equipment pieces, such as copper or fiber optic cables for telecommunication, coaxial cables for cable TV, coaxial or fiber optic cables linking computer networks, etc. Conventional installation methods include, but not limited to, the use of attachment hardware, such as braces, bands, straps, guards, brackets, clamps, hooks, bolts, screws, anchors, etc., as mentioned earlier.

Figure 2:
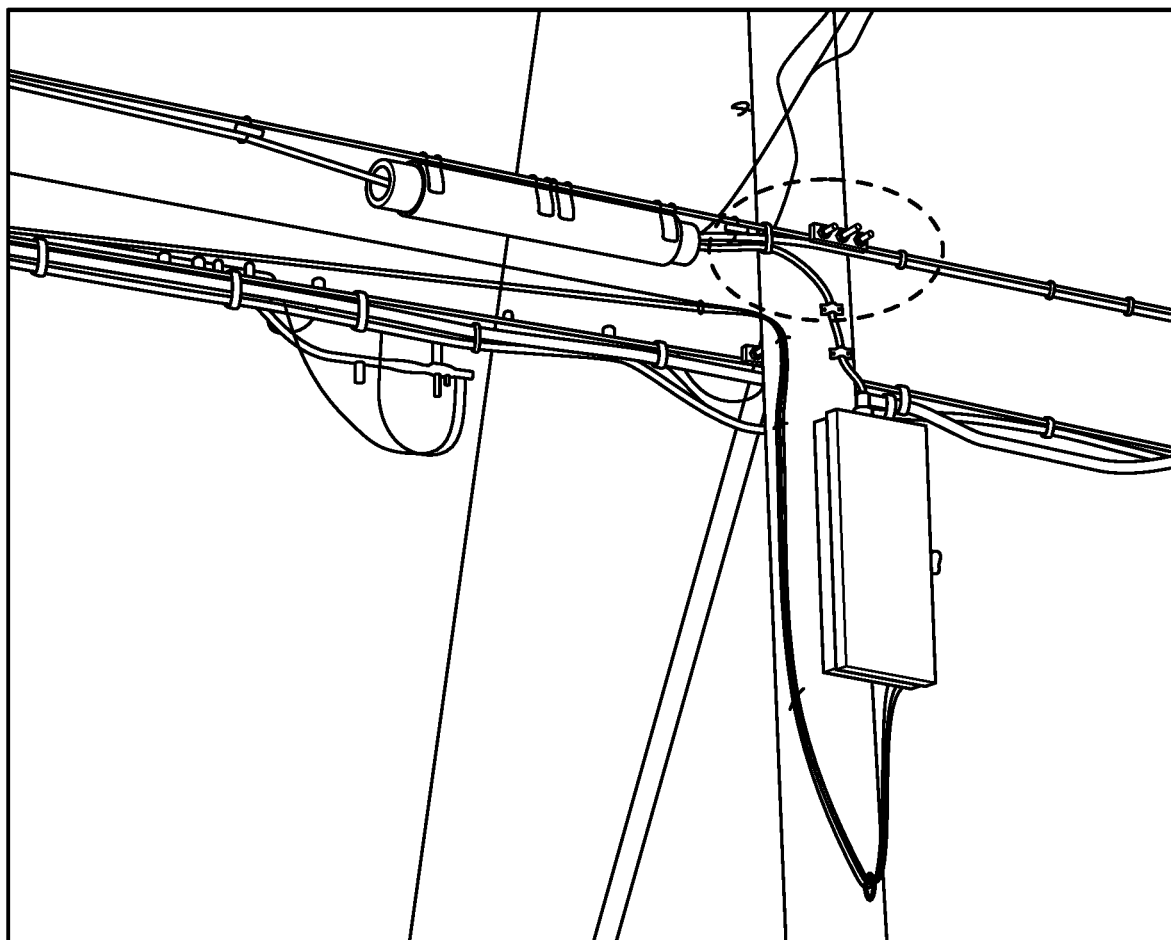
FIG. 2 illustrates a typical example of a utility pole where a fiber optic cable and a splice enclosure connected thereto are hanging on a messenger wire that is supported by the attachment hardware attached to the pole.

In addition to, or as an alternative to, the conventional installation methods, a fiber optic cable may be installed by using a messenger wire. The messenger wire may be a separate catenary wire to hang the fiber optic cable, or an insulated steel or dielectric wire pre-bundled with the fiber optic cable. FIG. 2 illustrates a typical example of a utility pole where a fiber optic cable and a splice enclosure connected thereto are hanging on a messenger wire that is supported by the attachment hardware attached to the pole, as indicated by a circle with broken line.

As seen in the above illustrations, each communication line is mounted on the pole typically by using an attachment hardware piece bolted or screwed into the pole. With the increase in the number of lines, many more holes are drilled into the pole, which may eventually cause structural degradation and troublesome interference between different lines in proximity. In view of the above problems associated with installing multiple communication lines on a utility poles, this document describes a new type of pole attachment hardware, termed "a joint-use bracket (JUB)" herein, and a new method by using the JUB to reliably install multiple communication lines in an orderly fashion.

Details of the structure and mechanism of the present JUB, according to an embodiment, are explained below with reference to FIGS. 3-20, illustrating various views of the assembled JUB as well as various views of key components. For the sake of clarity in these figures, where there are a plurality of like parts, only one of them is pointed by a reference number; however, it should be interpreted that the same reference number refers to each of the plurality of like parts.

Figure 3:
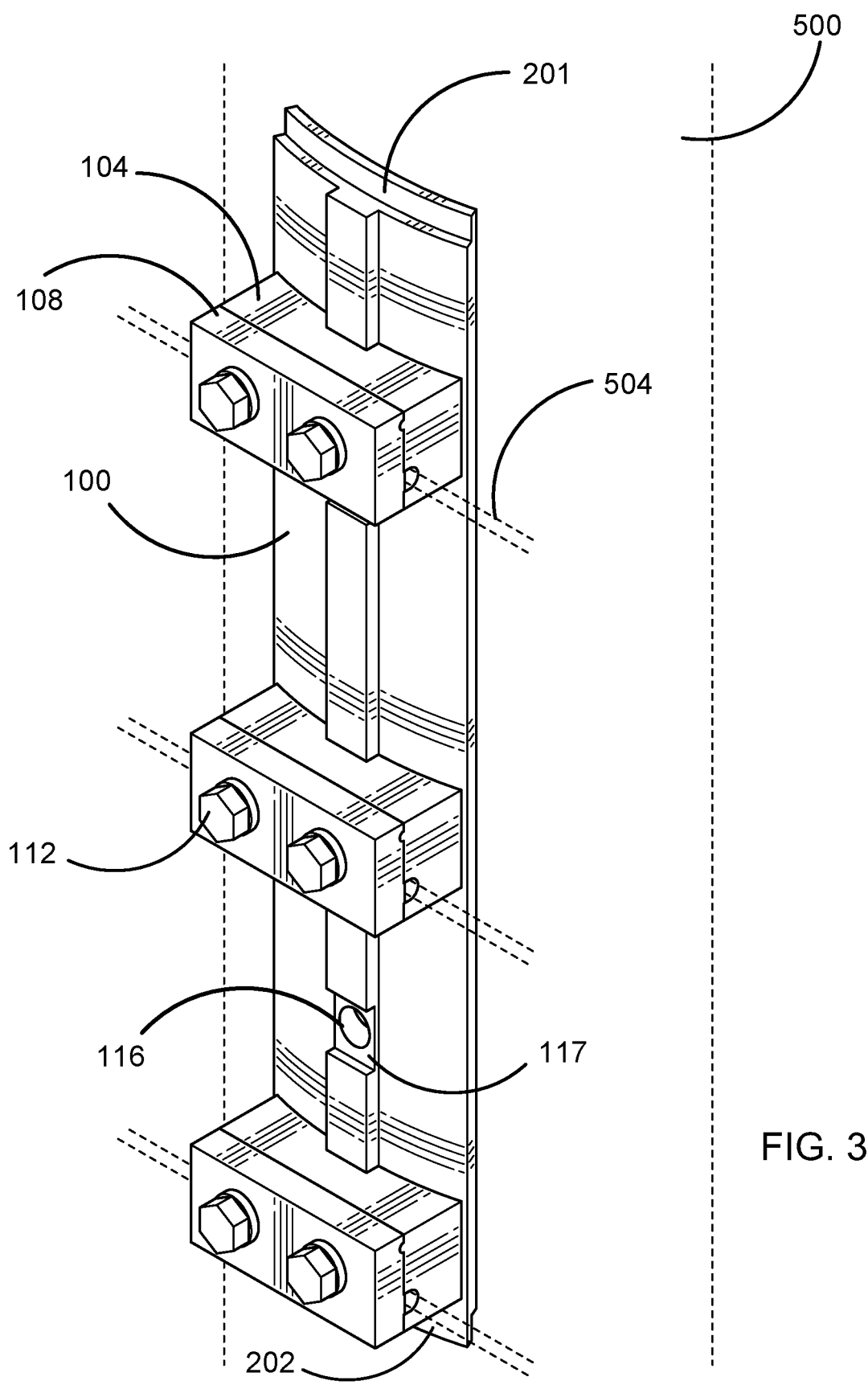
FIG. 3 illustrates a perspective view of the joint-use bracket (JUB) in use, where the JUB is assembled and mounted on a utility pole, and cables are installed to the assembled JUB.
Figure 4:
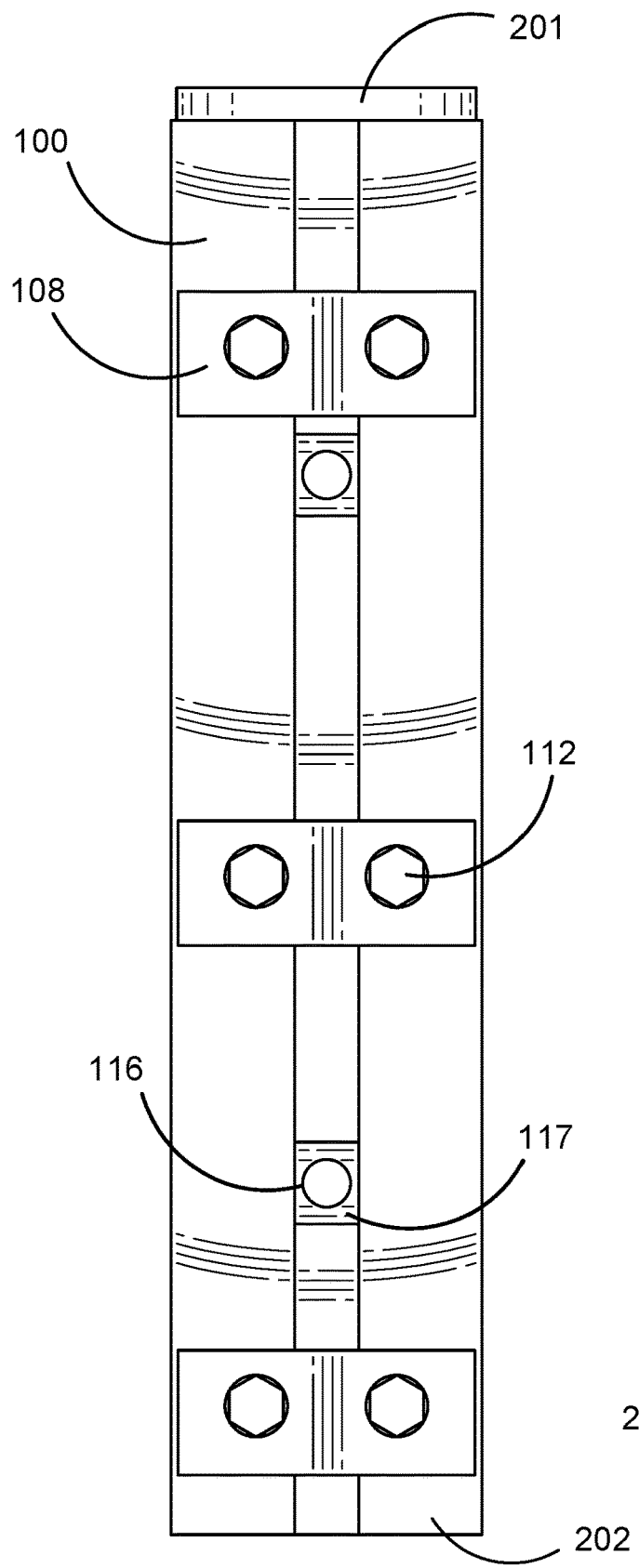
FIGS. 4-8 illustrate a front view, a back view, a side view, a top view, and a bottom view, respectively, of the assembled JUB.

FIG. 3 illustrates a perspective view of the assembled JUB in use, where the JUB is assembled and mounted on a utility pole 500. FIG. 3 further illustrates that cables 504 are installed to the assembled JUB. In this document, messenger wires supporting communication cables, the communication cables themselves, and other physical wires and cables associated with communication lines to be installed onto the joint-use section of the utility pole 500 are collectively called "cables."

Figure 9:
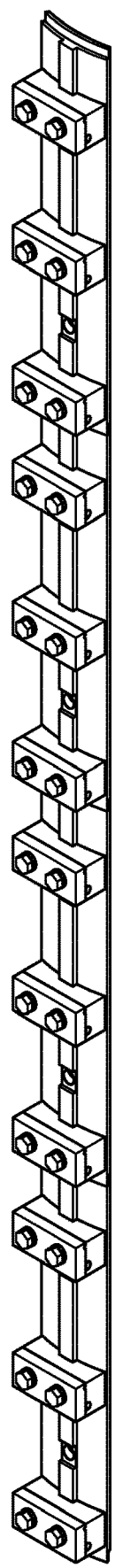
FIG. 9 illustrates a perspective view of a plurality of assembled JUBs stacked longitudinally.

FIGS. 4-8 illustrate a front view, a back view, a side view, a top view, and a bottom view, respectively, of the assembled JUB. FIG. 9 illustrates a perspective view of a plurality of assembled JUBs stacked longitudinally. Hereinafter, either the assembled or the disassembled JUB is referred to as the JUB.

The JUB comprises: a curved plate 100; a plurality of platforms 104, each having a shape of a generally cuboid contiguously formed on the front surface of the curved plate 100; a plurality of blocks 108, each having a shape of a generally cuboid, configured to engage with the plurality of platforms 104, respectively; and a plurality of joining fasteners 112 for fastening each block 108 to the corresponding platform 104. A plurality of attachment holes 116 are formed in the curved plate 100; and a slot 117 is formed laterally on the front surface of the curved plate 100 around the opening of each attachment hole 116. As explained later, each attachment hole 116 and the slot 117 formed therearound are configured to be used for attaching the JUB to the utility pole 500 by one or more attaching means.

The curved plate 100 is shaped to be generally rectangular, elongated along a longitudinal direction and curved along a lateral direction. As illustrated in FIG. 3, the curvature is configured to generally conform to the circumference of the utility pole 500, which has a generally cylindrical shape and is built vertically upright with the cylindrical axis pointing vertical to the ground. Thus, the curved plate 100 is formed so as to be mounted on the surface of the utility pole 500, to have its longitudinal direction aligned with the vertically upright pole and have its back surface, which is laterally curved inwardly, placed to cover part of the surface of the cylindrically-shaped pole 500.

As illustrated in FIGS. 3-8, the top end portion of the curved plate 100 is formed to include a back eave 201, which extends in the longitudinal direction outwardly, having the same width and curvature as the curved plate 100 and a half the thickness of the curved plate 100 from the back surface. Similarly, the bottom end portion of the curved plate 100 is formed to include a front eave 202, which extends in the longitudinal direction outwardly, having the same width and curvature as the curved plate 100 and a half the thickness of the curved plate 100 from the front surface.

In the example illustrated in FIG. 9, four JUB devices are stacked longitudinally by mating the front eave 202 of one JUB and the back eave 201 of an adjacent JUB at each joint. Thus, these eaves 201 and 202 are configured to mate with one another, enabling any number of JUB to be stacked longitudinally as needed.

Figure 10:
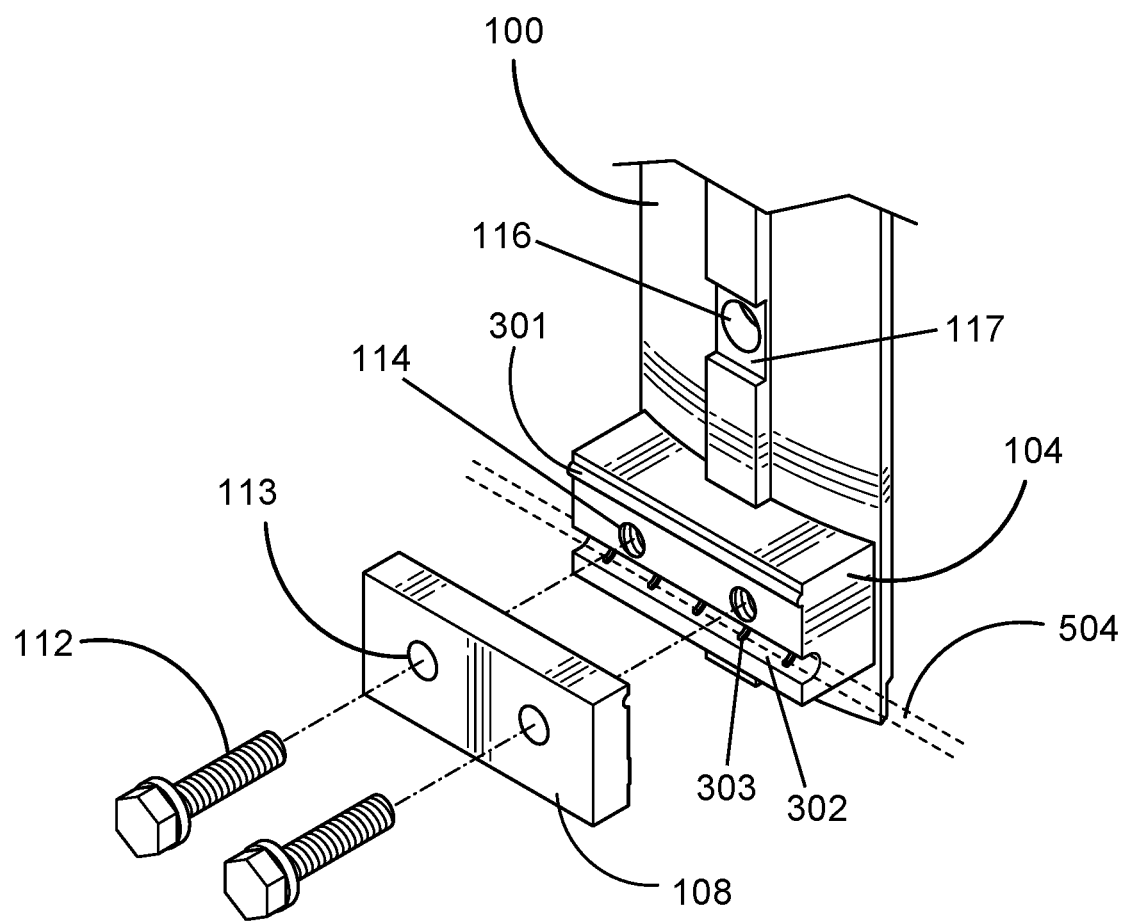
FIG. 10 illustrates an exploded perspective view of a lower portion of the JUB, showing assembling/disassembling of the components of the JUB.
Figure 11:
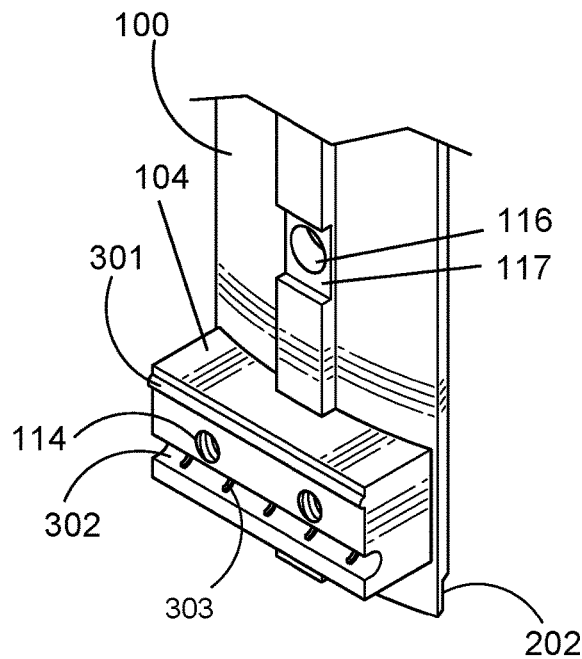
FIGS. 11-14 illustrate a perspective view, a front view, a side view, and a bottom view of the lower portion of the JUB, respectively, where the block and the joining fasteners are removed.
Figure 12:
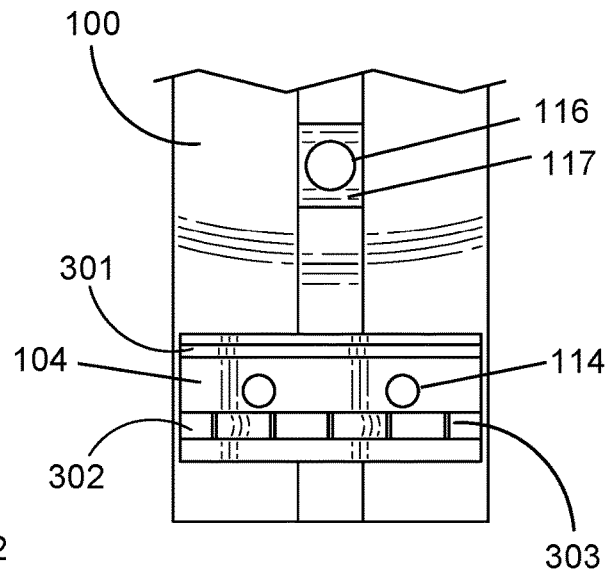
Figure 13:
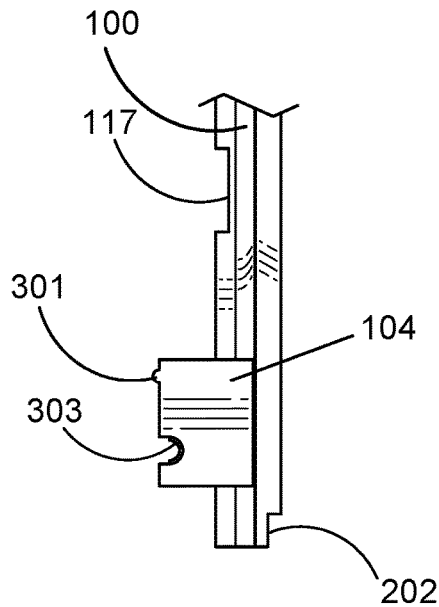
Figure 14:
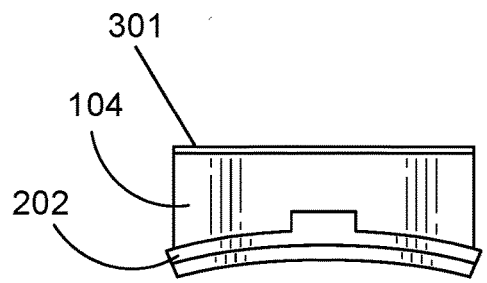
Figure 15:
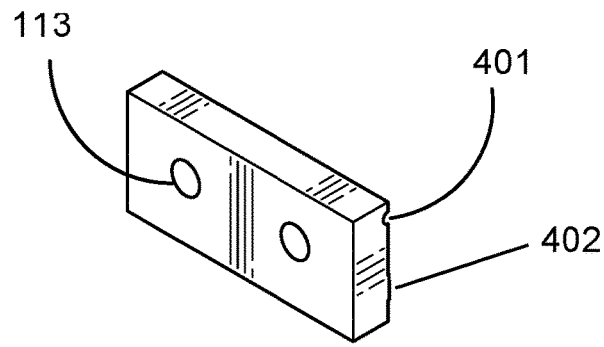
FIGS. 15-20 illustrate a perspective view, a side view, a front view, a back view, a bottom view, and a top view, respectively, of the block.
Figure 16:
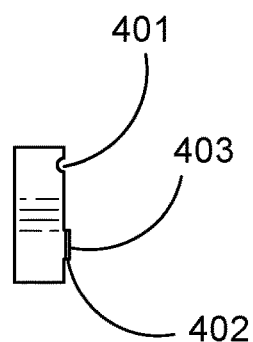
Figure 17:
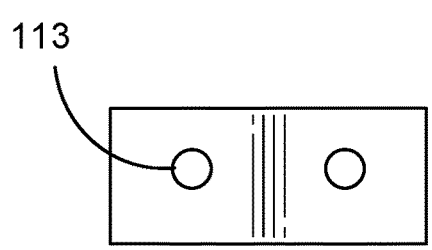
Figure 18:
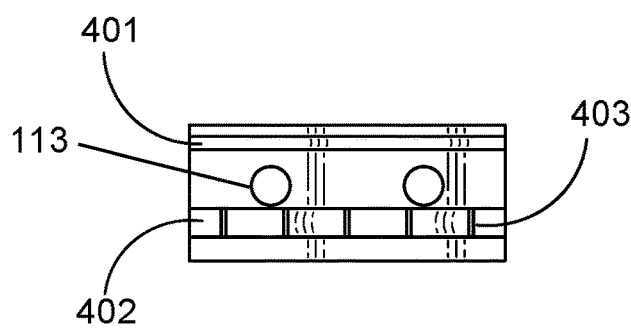
Figure 19:
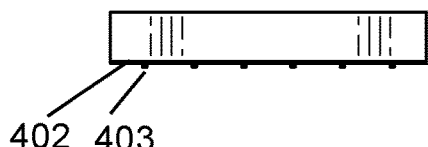
Figure 20:
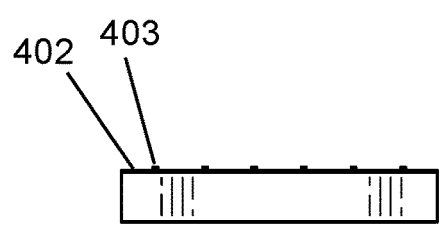

FIG. 10 illustrates an exploded perspective view of a lower portion of the JUB, showing assembling/disassembling of the components of the JUB. FIGS. 11-14 illustrate a perspective view, a front view, a side view, and a bottom view of the lower portion of the JUB, respectively, wherein the block 108 and the joining fasteners 112 are removed. FIGS. 15-20 illustrate a perspective view, a side view, a front view, a back view, a bottom view, and a top view, respectively, of the block 108. A plurality of joining holes 113 are formed in each block 108, and a plurality of receiving holes 114 are formed in the corresponding platform 104. These joining holes 113 and the receiving holes 114 are configured to correspond to each other for use for fastening the block 108 to the corresponding platform 104 by the plurality of joining fasteners 112.

Referring back to FIG. 5, the back surface of the curved plate 100 is illustrated to be smooth and uniform except for six openings of the receiving holes 114 and two openings of the attachment holes 116. However, in order to reduce the weight and the amount of the material needed to manufacture the JUB device, the thickness of some portions of the curved plate 100 may be reduced, thereby making the back surface uneven. In this case, to keep a certain strength around each hole, the original thickness of the curved plate 100 may be retained around each hole, appearing as a raised concentric ring around each opening (shown in broken lines in FIG. 5).

Figure 5:
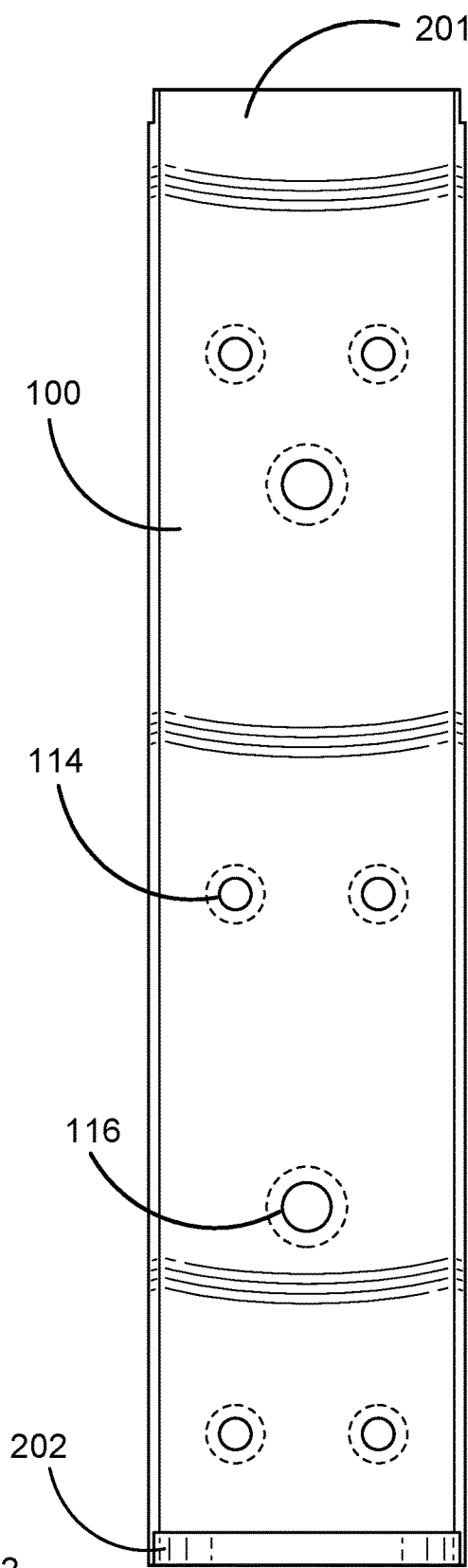
Figures 6, 7, 8:
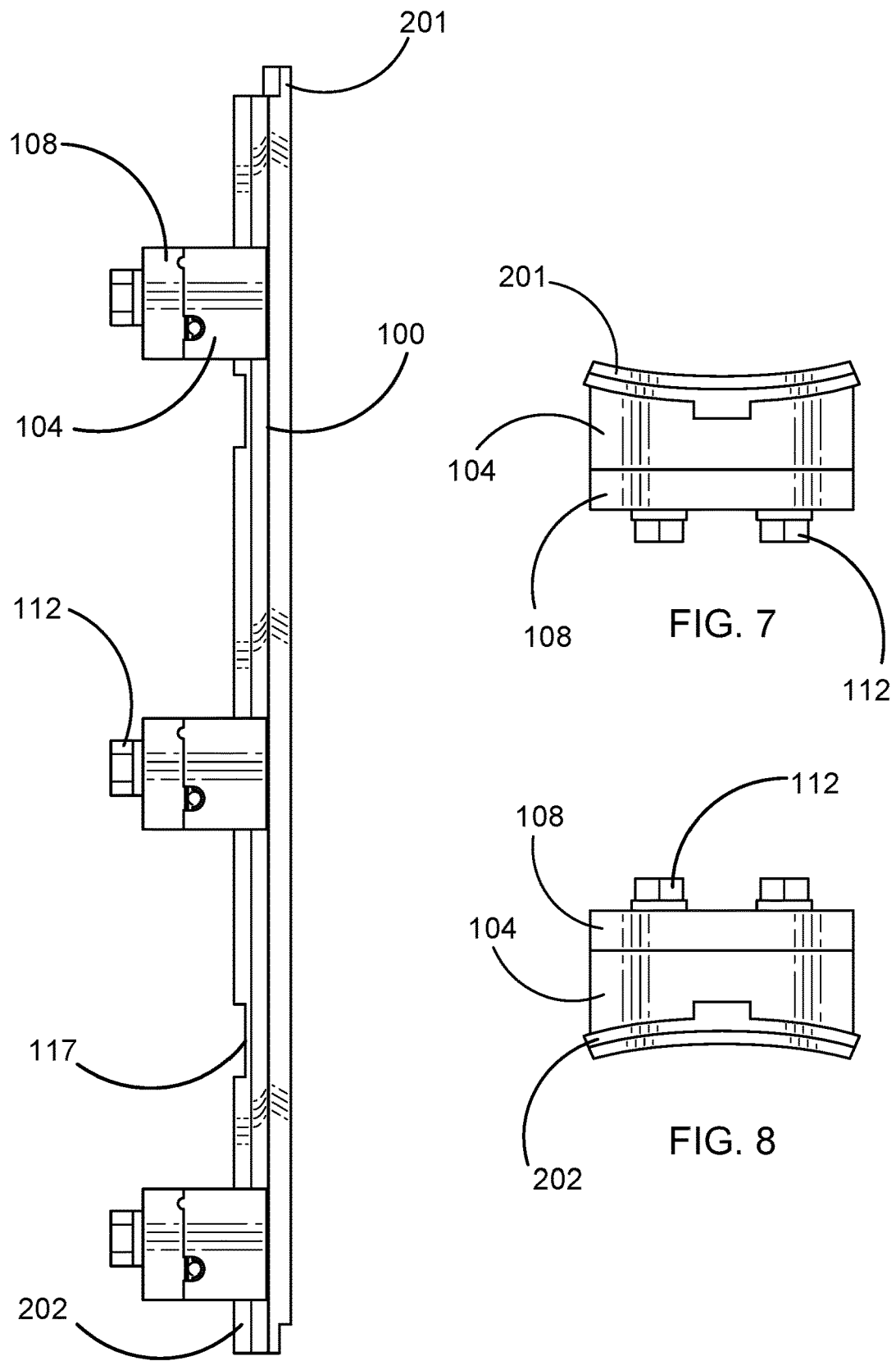

FIG. 10 illustrates how the joining fasteners 112 are used to fasten each block 108 to the corresponding platform 104, based on an example of the JUB having two joining fasteners 112, two joining holes 113 per block 108, and two receiving holes 114 per platform 104. The joining holes 113 may be unthreaded through holes. The receiving holes 114 may be threaded. In FIG. 5, the receiving holes 114 formed in each platform 104 are illustrated to be through holes; however, they may not be through holes depending on the type and size of the joining fasteners 112. Each joining fastener 112 may comprise a bolt and a spring washer, the bolt having a hexagonal head and a threaded side surface, as illustrated in the figures; however, the joining fastener 112 may comprise other type of bolt with or without one or more washers The number of the joining fasteners 112 for a pair of the block 108 and the platform 104, and correspondingly the number of the joining holes 113 and the receiving holes 114 in the pair, can be changed depending on the stability, strength, durability, and other mechanical considerations.

Each block 108 and the corresponding platform 104 are configured to engage with each other and be fastened to each other by the joining fasteners 112 so as to clamp the cable 504 that is placed laterally between the block 108 and the platform 104, thereby to hold the cable 504 securely. As illustrated in FIGS. 11-14, the front surface of each platform 104 is formed to have a ridge 301 and a first groove 302 having a plurality of first ribs 303 formed therein. As illustrated in FIGS. 15-20, the back surface of each block 108 has a second groove 401 and a plateau 402, which is contiguously formed on and slightly raised from the back surface of the block 108 and has a plurality of second ribs 403 formed thereon. The ridge 301, the first groove 302, the second groove 401, and the plateau 402 are formed to be laterally extended. The plurality of first ribs 303 and the plurality of second ribs 403 are formed to align in the longitudinal direction and laterally disposed in parallel. The ridge 301 on the front surface of the platform 104 and the second groove 401 on the back surface of the block 108 are configured to engage with each other. The first groove 302 on the front surface of the platform 104 and the plateau 402 on the back surface of the block 108 are configured to engage with each other. These formations are configured to engage the block 108 and the corresponding platform 104 in place. The cable 504 can be placed along and between the first groove 302 and the plateau 402, and the joining fasteners 112 can be inserted through the joining holes 113 and the receiving holes 114 to fasten the block 108 to the corresponding platform 104 to clamp the cable 504 between the first groove 302 and the plateau 402, whereby the cable 504 is securely held between the block 108 and the platform 108. The clamping force is enhanced by additional pressure from the first ribs 303 and the second ribs 403, which also provide a frictional force to prevent the cable 504 from sliding laterally.

The number of pairs of the platforms 104 and the block 108 and their individual sizes, as well as the locations of the platforms 104 and each spacing between two adjacent platforms 104 on the curved plate 100, may be determined based primarily on the strength and stability required to support the weight of individual cables 504. If needed, two or more JUBs can be stacked and mounted onto the pole vertically to hold as many cables 504 as needed, as illustrated in FIG. 9.

As mentioned earlier, in the JUB, a plurality of attachment holes 116 are formed through the curved plate 100 with openings on the front and back surfaces of the curved plate 100, and a slot 117 is formed around the opening of each attachment hole 116 on the front surface of the curved plate 100. The JUB may be fastened to the utility pole 500 by one or more attachment fasteners (not shown) such as screws, nails, or bolts configured to be inserted through one or more attachment holes 116, respectively, and screwed, nailed, or drilled into the pole 500. The number, sizes, and locations of the attachment holes 112, as well as each spacing between two adjacent attachment holes 112, may be determined based primarily on the strength and stability required to support the JUB having multiple cables installed thereto. Each of the attachment holes 112 may be threaded or unthreaded depending on the type of attachment fasteners.

The slot 117 formed laterally around each attachment hole 116 may be used to laterally hold a strap, a wire, a rope, or other banding material (not shown) to wrap around and tie the JUB onto the utility pole 500. This can be done additionally or alternatively to using the attachment fasteners inserted through the attachment holes 116. As mentioned earlier, it is generally not possible nor recommended to drill holes into a concrete pole or a steel pole. The present JUB is formed to have the slots 117, enabling the use of straps, wires, ropes, or other banding materials as alternate attachment means where the use of screws or bolts is prohibitive.

Referring back to FIGS. 1 and 2, the conventional attachment hardware for installing cables to a utility pole is typically designed to support only one cable; thus, multiple pieces of attachment hardware are individually attached to the pole by drilling holes to fasten them with bolts or screws. On the other hand, the JUB is capable of supporting two or more cables collectively in an orderly fashion, thereby mitigating the crowding of the joint-use section of a utility pole. Furthermore, the number of screws or bolts through the attachment holes 116 used for fastening the JUB to the pole can be as small as 2; therefore, the damage to the pole due to the fastening of screws or bolts becomes less than the case of using multiple individual pieces of conventional attachment hardware.

The JUB may be manufactured by using, for example, an aluminum molding technique to form the curved plate 100, the plurality of platforms 104 contiguous thereto, and the plurality of blocks 108, and providing the plurality of joining fasteners 112 with the thread corresponding to the threaded receiving holes 114. The curved plate 100 made of metal naturally provides a protective covering over the surface of the utility pole 500, further mitigating the degradation of the pole surface.

Therefore, according to an embodiment, the use of the JUB gives rise to a new method of installing a plurality of cables associated with a plurality of communication lines onto the joint-use section of a utility pole, which is generally cylindrically shaped and built vertically upright, The JUB can be mounted on a surface of the utility pole 500 by placing the curved plate 100 to have the longitudinal direction aligned with the vertically upright direction and have the back surface covering part of the surface of the utility pole, the back surface being laterally curved inwardly with a curvature that is configured to generally conform to a circumference of the utility pole. Here, the attachment can be carried out by: using one or more of the plurality of attachment holes 116 formed through the curved plate 100 to insert one or more attachment fasteners (e.g., screws, bolts, nails, etc., not shown in the figures) therethrough, respectively, to fasten the curved plate 100 to the utility pole 500; using one or more of the plurality of slots 117 formed laterally around the attachment holes 116, respectively, on the front surface of the curved plate 100 to laterally hold one or more straps, wires, ropes, or other banding materials (not shown in the figures) to wrap around and tie the curved plate 100 onto the utility pole 500; or a combination of the above two methods. A cable associated with a communication line is placed along and between the first groove 302 of the platform 104 and the plateau 402 of the block 108; the platform 104 and the block 108 are engaged by using the formations on the back surface of the block 108 and the front surface of the platform 104; and the joining fasteners 112 are inserted through the joining holes 113 and the receiving holes 114 to fasten the block 108 to the corresponding platform 104 to clamp the cable 504 between the first groove 302 and the plateau 402, whereby the cable 504 is securely held between the block 108 and the platform 108. It should be noted that, according to the present process of installing communication lines to a utility pole by using the JUB, the various steps in the process do not have to be in the order that is described above; they can be interchanged, sequenced differently, or carried out in parallel, depending on efficiency of operations, convenience of applications or any other scenarios.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A joint-use bracket (JUB) for use for installing a plurality of cables associated with a plurality of communication lines onto a joint-use section of a utility pole, which is generally cylindrically shaped and built vertically upright, the joint-use bracket comprising:
   a curved plate having a generally rectangular shape elongated in a longitudinal direction and curved along a lateral direction with a curvature configured to generally conform to a circumference of the utility pole, the curved plate being formed to have a plurality of attachment holes therethrough with openings on a front surface and a back surface thereof and a plurality of slots laterally formed on the front surface around the openings of the plurality of attachment holes, respectively;
   a plurality of platforms, each platform having a shape of a generally cuboid contiguously formed on the front surface of the curved plate and a plurality of receiving holes formed therein;
   a plurality of blocks configured to engage with the plurality of platforms, respectively, each block having a shape of a generally cuboid and a plurality of joining holes formed therein; and
   a plurality of joining fasteners configured to be inserted through the plurality of joining holes of each block and the plurality of receiving holes of the corresponding platform, respectively, to fasten the block to the platform to clamp the cable that is placed laterally between the block and the platform, thereby to hold the cable securely.

2. The joint-use bracket of claim 1, wherein
   a front surface of each platform is formed to have a ridge and a first groove having a plurality of first ribs formed therein; and
   a back surface of each block is formed to have a second groove and a plateau having a plurality of second ribs formed thereon,
   wherein
   the ridge, the first groove, the second groove, and the plateau are formed to be laterally extended, and the plurality of first ribs and the plurality of second ribs are formed to align in the longitudinal direction and laterally disposed in parallel.

3. The joint-use bracket of claim 2, wherein
   the second groove on the back surface of each block and the ridge on the front surface of the corresponding platform are configured to engage with each other, and the plateau on the back surface of the block and the first groove on the front surface of the platform are configured to engage with each other,
   wherein
   the plurality of joining fasteners are configured to be inserted through the plurality of joining holes of the block and the plurality of receiving holes of the platform, respectively, to fasten the block to the platform to clamp the cable that is placed along and between the first groove of the platform and the plateau of the block, wherein the plurality of first ribs and the plurality of second ribs provide a frictional force to prevent the cable from sliding laterally.

4. The joint-use bracket of claim 1, wherein
   each of the plurality of attachment holes formed through the curved plate is configured for inserting an attachment faster including a screw, a nail, or a bolt to fasten the curved plate to the utility pole.

5. The joint-use bracket of claim 1, wherein
   each of the plurality of slots is configured for laterally holding a banding material including a strap, a wire, or a rope to wrap around and tie the curved plate onto the utility pole.

6. The joint-use bracket of claim 1, wherein
   a first end portion of the curved plate is formed to include a back eave, which extends in the longitudinal direction outwardly and has the same width and curvature as the curved plate and a half the thickness of the curved plate from the back surface; and
   a second end portion of the curved plate is formed to include a front eave, which extends in the longitudinal direction outwardly and has the same width and curvature as the curved plate and a half the thickness of the curved plate from the front surface,
   wherein
   the front eave of one joint-use bracket and the back eave of another joint-use bracket are configured to mate with each other, enabling a plurality of joint-use brackets to be stacked longitudinally.

7. A method of installing a plurality of cables associated with a plurality of communication lines onto a joint-use section of a utility pole, which is generally cylindrically shaped and built vertically upright, by using the joint-use bracket (JUB) of claim 1, the method comprising:
   attaching the joint-use bracket on a surface of the utility pole by placing the curved plate to have the longitudinal direction aligned with the vertically upright direction and have the back surface covering part of the surface of the utility pole, the back surface being laterally curved inwardly with a curvature configured to generally conform to a circumference of the utility pole;
   placing laterally the cable between each block and the corresponding platform; and
   inserting the plurality of joining fasteners through the plurality of joining holes of the block and the plurality of receiving holes of the platform, respectively, to fasten the block to the platform to clamp the cable placed laterally between the block and the platform, thereby to hold the cable securely.

8. The method of claim 7, wherein
the attaching comprises:
using one or more of the plurality of attachment holes formed through the curved plate to insert one or more attachment fasters including screws, nails, or bolts therethrough, respectively, to fasten the curved plate to the utility pole;
using one or more of the plurality of slots formed laterally on the front surface of the curved plate to laterally hold one or more banding materials including straps, wires, or ropes, respectively, to wrap around and tie the curved plate onto the utility pole; or
a combination of the above.

9. The method of claim 7, wherein
a front surface of each platform is formed to have a ridge and a first groove having a plurality of first ribs formed therein; and
a back surface of each block is formed to have a second groove and a plateau having a plurality of second ribs formed thereon,
wherein
the ridge, the first groove, the second groove, and the plateau are formed to be laterally extended, and the plurality of first ribs and the plurality of second ribs are formed to align in the longitudinal direction and laterally disposed in parallel,
wherein
the second groove on the back surface of each block and the ridge on the front surface of the corresponding platform are configured to engage with each other, and the plateau on the back surface of the block and the first groove on the front surface of the platform are configured to engage with each other,
wherein
the placing laterally comprises placing the cable along and between the first groove of the platform and the plateau of the block; and
the inserting comprises inserting the plurality of joining fasteners through the plurality of joining holes of the block and the plurality of receiving holes of the platform, respectively, to fasten the block to the platform to clamp the cable placed along and between the first groove and the plateau, wherein the plurality of first ribs and the plurality of second ribs provide a frictional force to prevent the cable from sliding laterally.

10. A method of installing a plurality of cables associated with a plurality of communication lines onto a joint-use section of a utility pole, which is generally cylindrically shaped and built vertically upright, by using a plurality of joint-use brackets (JUBs) and by repeating the method of claim 7 for each joint-use bracket, wherein
each joint-use bracket comprises: a first end portion of the curved plate formed to include a back eave, which extends in the longitudinal direction outwardly and has the same width and curvature as the curved plate and a half the thickness of the curved plate from the back surface; and a second end portion of the curved plate formed to include a front eave, which extends in the longitudinal direction outwardly and has the same width and curvature as the curved plate and a half the thickness of the curved plate from the front surface,
wherein the front eave of one joint-use bracket and the back eave of another joint-use bracket are configured to mate with each other,
the method further comprising:
stacking longitudinally the plurality of joint-use brackets by mating the front eave of one joint-use bracket and the back eave of another joint-use bracket.

* * * * *